3,636,153
PROCESS FOR THE PRODUCTION OF METHYL-
AMINE TOGETHER WITH DIMETHYLAMINE
Edgar Enders, Cologne-Flittard, and Dieter Hüllstrung,
Leverkusen, Germany, assignors to Farbenfabriken
Bayer Aktiengesellschaft, Leverkusen, Germany
No Drawing. Filed Feb. 10, 1969, Ser. No. 798,111
Claims priority, application Germany, Mar. 5, 1968,
P 16 68 906.8
Int. Cl. C07c 85/00, 87/08
U.S. Cl. 260—583 J                                    9 Claims

ABSTRACT OF THE DISCLOSURE

Process for producing methylamine and dimethylamine by passing a mixture of carbon monoxide, hydrogen and nitrogen over a catalyst containing zirconium or hafnium at a temperature of about 300° to 600° C.

---

It is known that a mixture of methylamine, dimethylamine and trimethylamine can be obtained by reacting methanol and ammonia together at an elevated temperature, or by hydrogenating hydrogen cyanide over noble metal catalysts.

It is also known that hydrogen and nitrogen can be reacted over various catalysts to form ammonia. Unfortunately, the presence of carbon monoxide is a disadvantage and promotes losses of yield. It is also known that hydrogen cyanide can be obtained by passing a mixture of 2 parts by volume of carbon monoxide, 1 part by volume of nitrogen and 3 parts by volume of hydrogen, and also small quantities of oxygen, over uranium carbide at 510° C. (U.S. patent specification No. 1,492,193).

A process for the production of methylamine together with dimethylamine has now been found in which a gaseous mixture consisting of carbon monoxide, nitrogen and hydrogen is passed at an elevated temperature and optionally at an elevated pressure over a catalyst containing zirconium and/or hafnium, preferably in admixture with, or alloyed with, a metal of Group Ib and/or IIb and/or Group VIII of Mendeleef's Periodic Table of the elements.

It is novel and surprising that methylamine and small quantities of dimethylamine are obtained under the working conditions claimed from a mixture of nitrogen, carbon monoxide and hydrogen.

In contrast with the production of methylamine from methanol and ammonia or the hydrogenation of hydrogen cyanide over noble metal catalysts, the process according to the invention enables nitrogen and water gas to be reacted together in a single stage to give methylamine without any need for the intermediate preparation of methanol ammonia or hydrogen cyanide.

Depending on the composition of the catalyst, the reaction begins at from about 300 to about 400° C. at normal or elevated pressure, for example, at a pressure of from about 50 to about 600 atms. (preferably from about 50 to about 300 atms.). Corresponding to the contraction in volume during the reaction

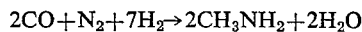
$$2CO + N_2 + 7H_2 \rightarrow 2CH_3NH_2 + 2H_2O$$

the reaction is promoted by the application of excess pressure.

Suitable catalysts include zirconium metal, commercial hafnium-containing zirconium metal or hafnium metal, preferably in admixture with, or alloyed with, copper, silver, gold, nickel, cobalt or iron and/or a noble metal from Group VIII of the Periodic Table.

It is preferred to use mixtures or alloys containing zirconium metal or commercial hafnium-containing zirconium metal in quantities of from 30 to 80% by weight.

It is also possible for one or more metals of Group Ib and/or Group VIII of the Periodic Table to be present in the catalyst alloy in quantities which are preferably from 20 to 70% by weight. Alloy consisting of from 30% to 80% of zirconium and from 70% to 20% of silver, and preferably of from 40 to 60% of zirconium and 60 to 40% of silver, in which some of the silver may be replaced by copper, gold, palladium or platinum, have proved to be particularly effective and selective in their action.

Under the reaction conditions, all or part of the zirconium and/or hafnium component of the catalyst is converted into the hydride, nitride or carbide form. Modifications of the catalyst alloys such as these are to be regarded as part of the invention. In addition, the catalyst alloys may contain other metals, for example zinc, in quantities of from 2 to 10%.

The catalyst alloy is used in finely divided form with the largest possible surface, for example in the form of fine cuttings, in granular (ground) form or in powder form. In order to maintain this state of fine division and to prevent the catalyst alloy from caking or sintering, finely divided or shaped (granular) inert materials such as asbestos, alumina, porcelain, silica, graphite, aluminium phosphate, tin dioxide, titanium dioxide or zirconium dioxide may be added, or alternatively the catalyst alloy may be applied to materials of this kind.

The composition of the gas mixture may fluctuate within wide limits. For example, it is possible to use a mixture containing 20% of carbon monoxide, 10% of nitrogen and 70% of hydrogen as shown in the above equation. It is also possible, however, to react one of the components as completely as possible and to use smaller proportions of one or two components, for example from 2 to 20% of nitrogen or from 2 to 30% of carbon monoxide, the remainder being hydrogen.

Depending upon the composition of the catalyst, the reaction of the gas mixture over the metal catalysts begins at temperatures in the range of from 300 to 400° C. It is best not to exceed temperatures above 600° C. so as to avoid oxide formation and hence to prevent deactivation of the catalysts.

Temperatures in the range of from about 300 to about 600° C. (and preferably from about 300 to about 500° C.) are normally used. The residence time of the gas mixture to be reacted over the catalyst may amount, for example, to from 1 to 20 seconds.

The yield of methylamine in addition to dimethylamine from a single run under a pressure of about 100 atms. amounts to 5%, for example.

EXAMPLE 50 parts by weight of an alloy consisting of 50% by weight of zirconium and 50% by weight of silver in the form of a fine powder are introduced into a cylindrical contact furnace with a capacity of 50 parts by volume. Hydrogen is passed through and the temperature inside the furnace is slowly increased to 300° C. The hydrogen is then replaced by a mixture of 20% by volume of carbon monoxide, 10% by volume of nitrogen and 70% by volume of hydrogen, and the temperature is increased to 450° C. and the pressure to 100 atms. 3.5 millimols per hour of methylamine are obtained in the waste gas for a rate of gas flow of 800 parts by volume per hour (as measured under normal pressure, corresponding to 72 milliequivalents of nitrogen per hour). The methylamine contains dimethylamine in detectable quantities. In addition, the waste gas contains methane, carbon dioxide and higher hydrocarbons in total quantities of from 1.0 to 3.0%.

The same result is obtained with a catalyst consisting of 60% by weight of zirconium, 35% by weight of silver and 5% by weight of palladium or platinum, or with a catalyst consisting of 60% by weight of zirconium, 35% by weight of silver and 5% by weight of zinc or 5% by weight of copper. Although catalysts consisting of 60% by weight of zirconium and 40% by weight of copper, nickel, cobalt or iron give substantially the same yields of methylamine, the waste gas then contains larger quantities of methane and higher hydrocarbons.

What is claimed is:

1. Process for the production of methylamine and dimethylamine which comprises passing a gas mixture consisting of carbon monoxide, nitrogen and hydrogen, over a catalyst selected from the group of zirconium and hafnium and mixtures of the foregoing at a temperature of at least about 300° to about 600° C.

2. Process of claim 1 wherein said gas mixtures consist of from 2 to 30 percent by volume carbon monoxide, from 2 to 20 percent by volume nitrogen and the balance hydrogen.

3. Process of claim 1 carried out at a pressure of from about 50 to about 600 atmospheres.

4. Process of claim 1 carried out at a temperature of from about 300 to about 400° C.

5. Process of claim 1 wherein the residence time of the gas mixture over said catalyst is from 1 to 20 seconds.

6. Process of claim 1 wherein said catalyst is admixed or alloyed with one or more metals selected from Groups I$b$, II$b$, VIII of the Mendeleef's Periodic Table.

7. Process of claim 1 wherein said catalyst is admixed or alloyed with silver.

8. Process of claim 1 wherein said catalyst is admixed or alloyed with one or more metals selected from the group of zinc, palladium, platinum, copper and silver.

9. Process of claim 1 wherein said catalyst is an alloy consisting of from 30 to 80 percent by weight zirconium, from 18 to 60 percent by weight silver and from 2 to 10 percent by weight of a metal selected from the group of copper, gold, palladium, platinum and zinc.

References Cited

UNITED STATES PATENTS 1,492,193   4/1924   Beindl _____ 23—151

CHARLES B. PARKER, Primary Examiner

R. L. RAYMOND, Assistant Examiner

U.S. Cl. X.R.

252—461, 472, 473, 475; 260—583 R